INVENTOR
H. S. REICHARD
BY MARN & JANGARATHIS
ATTORNEYS

United States Patent Office 3,537,019
Patented Oct. 27, 1970

3,537,019
ELECTRICAL FILTER APPARATUS UTILIZING
ANALOG SIGNAL PROCESSING TECHNIQUES
Harry S. Reichard, Princeton Junction, N.J., assignor to
Princeton Applied Research Corporation, Princeton
Junction, N.J.
Filed Nov. 14, 1966, Ser. No. 594,080
Int. Cl. H04b 1/04
U.S. Cl. 328—165                           6 Claims

ABSTRACT OF THE DISCLOSURE

Electrical filter apparatus for extracting a signal of interest from a composite waveform is provided in accordance with the teachings of the present invention. According to an illustrative embodiment of the instant invention, the electrical filter apparatus includes means for sampling recurring cycles of a composite waveform and for providing a plurality of analog quantities which are each representative of a portion of said recurring composite waveform. The sampling means is synchronized with the signal of interest and means for converting said plurality of analog quantities into a waveform which is a function of time is additionally provided so that the waveform of said signal of interest may be derived from said analog quantities. The waveform of said signal of interest is thus educted from the recurring cycles of said composite waveform due to the averaging techniques employed in the sampling operation.

---

Figure 1:
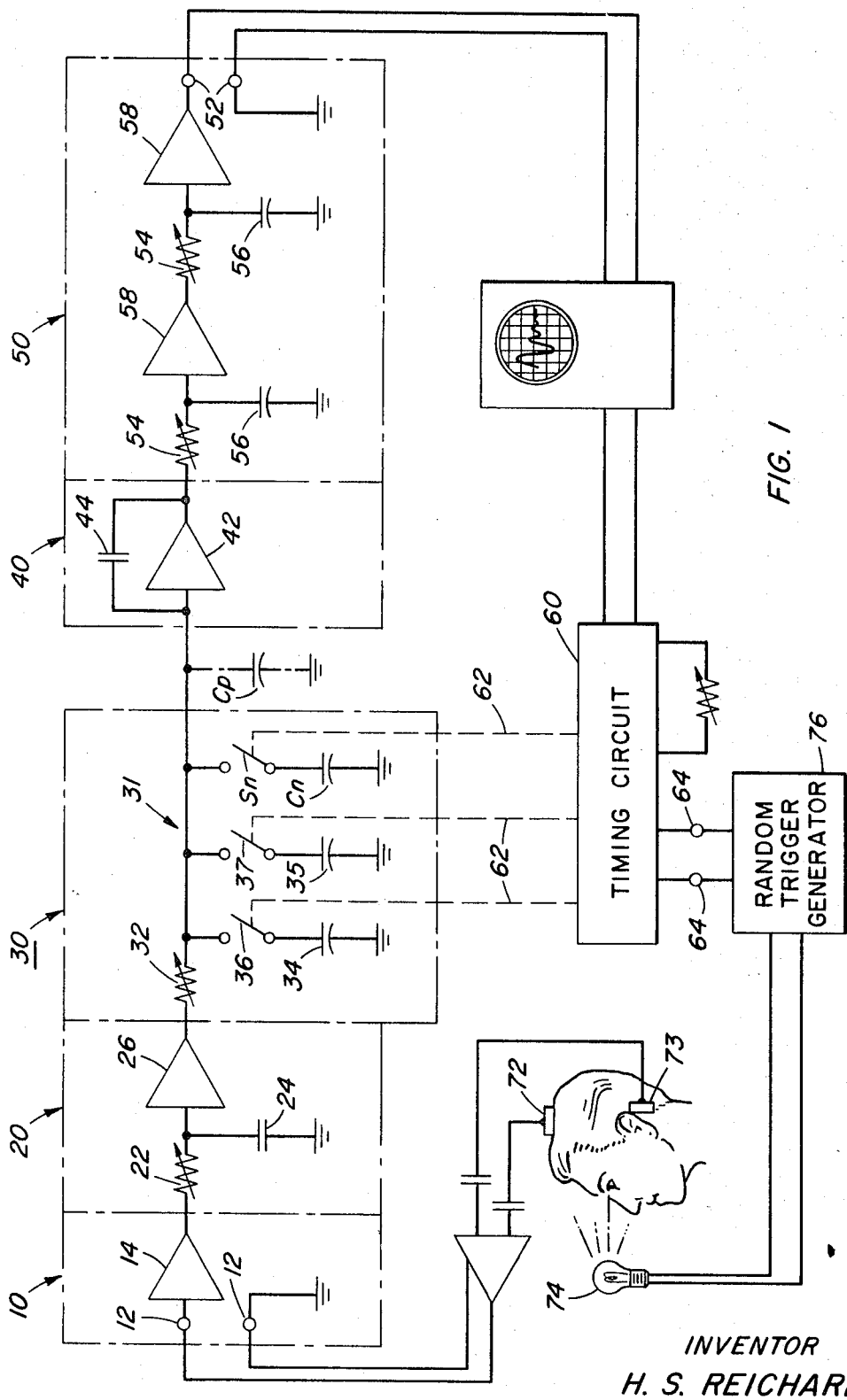

This invention relates generally to an electrical filter and, more particularly, to apparatus for extracting or measuring those features of a time varying voltage which are coherent with, or time related to, a synchronizing signal. This invention further relates to apparatus utilizing analog signal processing techniques, for providing a waveform representative of signals evoked from the brain of animal or human subjects in response to a stimulus.

There are numerous situations wherein significant signals or waveforms are embedded in, or are obscured, or masked, by noise or interference, and wherein such significant signals or waveforms are, or can be made to be, repetitive and coherent with some phenomenon, such as a flashing light, a synchronization or trigger pulse. Such unfavorable signal-to-noise ratio situations are particularly acute, for example, in brain wave analysis, or electro-encephalography, cardiograms, retinograms and radar signal recovery.

Obviously, the significant signals or waveforms of interest can be obtained if an electrical filter is provided for filtering such significant signals or waveforms out of composite signals comprised of such signals and noise or interference.

Accordingly, it is the primary object of this invention to provide such an electrical filter.

In the signal or waveform processing art (the term or expression "waveform" being used to denote a time varying voltage or a voltage which is a function of time), it is well-known that a random waveform tends to average to zero, and for practical purposes, the average of such a random waveform can be defined to be zero. Thus, if the average of a given waveform is not zero, the waveform, by definition, is not random, and it will be understood, that such a waveform is a composite waveform which is comprised of a DC component and any other waveform which will, or tend to, average to zero.

Accordingly, it has been found that if the electrical signal of interest is obscured by noise, and if the signal of interest is recurrent or can be repeated, the electrical signal of interest can be extracted, or measured, by summing or averaging coordinate points of the representative composite waveform. The signal of interest will consistently contribute substantially identical amounts to the sum, whereas the noise will contribute randomly positive and negative amounts which tend to average to zero over repetitive cycles, and, in accordance with the foregoing definition, can be considered to average to zero. Thus, the extracted or emerging waveform will be the signal or waveform of interest.

Accordingly, another object of the present invention is to provide apparatus for extracting or measuring features of a time varying voltage which are coherent with, or time related to, an observable or detectable phenomenon or a synchronizing pulse.

With regard to the above-mentioned brain wave analysis, or electro-encephalography, it is known that when a human or animal subject is exposed or subjected to an external stimulus, such as a flashing light, a sound, a touch, or even an internal event, such as respiration, electrical signals will be evoked from the brain. Such evoked electrical signals are extremely small in comparison with the large composite electrical signals from the brain indicative of general or overall brain activity. The problem of extracting or measuring the evoked signals from the composite signals is extremely difficult, and this is particularly true with human subjects where the recording electrodes are typically placed on the scalp and the recording made through the skull. This is also true, though to a lesser extent, with animal subjects (and at times with human subjects such as during brain surgery), where the brain activity recordings are typically made using implanted electrodes.

Accordingly, it is a further object of the present invention to provide new and improved apparatus for extracting from electrical signals indicative of overall brain activity, electrical signals evoked from the brain in response to a stimulus.

In the past, various apparatus and techniques have been provided for accomplishing such evoked signal extractions or measurements; however, the techniques employed by such apparatus have been primarily digital techniques. Since, for observation and signal utilization, it is most often desirable to have a waveform representative of the evoked brain signal, rather than a series of numbers representative of amplitudes at selected intervals, some prior art apparatus and techniques have included a digital to analog conversion step.

Accordingly, a still further object of the present invention is to provide apparatus for directly providing a waveform representative of the electrical signals evoked from the brain of a subject without the steps of analog-to-digital conversion, required in some of the prior art apparatus which employ digital signal processing techniques.

Referring again to the above-mentioned composite signal or waveform averaging, the method of averaging can be one that provides a weighted average, with the most weight being given to the most recently occurring events, and less and less weight being given to the earlier occurring events. More specifically, the most weight is given to the most recently sampled cycles of the composite waveform, and less and less weight is given to the earlier samples cycles of the composite waveform. However, where desired, other methods of signal averaging can be employed.

Figure 2:
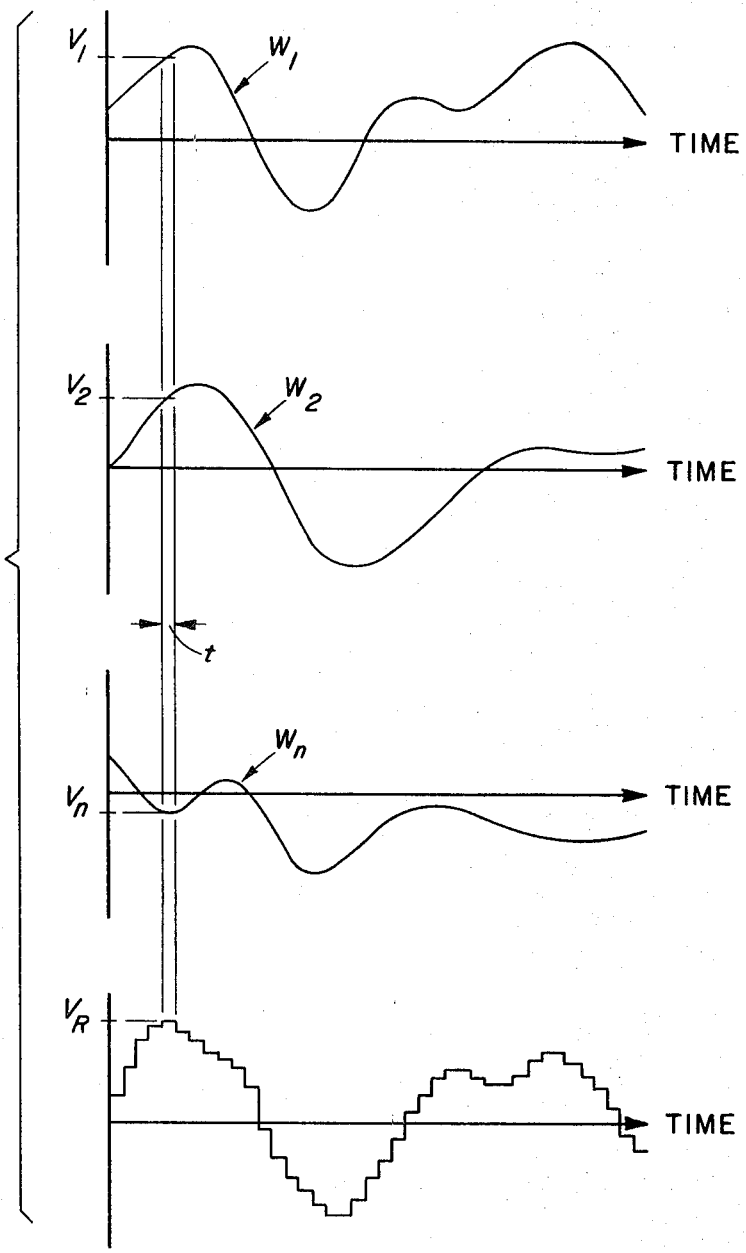

An even more complete understanding of the present invention may be obtained from the following detailed description when read in conjunction with the appended drawing, wherein:

FIG. 1 is a diagrammatic representation of a preferred embodiment of the present invention; and FIG. 2 is a series of several waveforms representing various cycles of the composite waveform to be averaged, and a waveform which is the weighted average of the various waveform cycles.

Referring now to FIG. 1, there is shown an electrical filter which includes an input amplifier stage 10, a pre-filter stage 20, a bank of synchronously commutated capacitors 30, a capacitance neutralizing buffer amplifier stage 40, an output soothing stage 50, and a timing circuit 60.

The input amplifier stage 10 includes a pair of input terminals 12 and a buffer amplifier 14, and presents a high input impedance to input signals and a low output impedance to the pre-filter stage 20.

The pre-filter stage 20 includes a low-pass filter, comprised of resistor R22 and capacitor C24, and a buffer amplifier 26. The pre-filter stage rejects signals well outside the pass band of the commutated capacitor bank 30, and thereby increases the dynamic range of the electrical filter.

The synchronously commutated capacitor bank 30 includes a bank of capacitors C34, C35 . . . C$n$, which capacitors are switched or connected sequentially to a signal bus 31 by switches S36, S37 . . . S$n$, respectively. The input to the capacitor bank is a single input resistor R32. The capacitors are analog storage elements, and each capacitor stores an analog signal in the form of a charge; each analog signal being representative of a portion of an input waveform. The resultant charge on each capacitor is a function of the input voltage waveform during the intervals the capacitor's associated switch is closed.

The capacitance neutralizing, buffer amplifier stage 40 includes a non-inverting amplifier 42 having a voltage gain greater than unity, a high input impedance, and a low output impedance. The amplifier is provided with feed-back, the output of the amplifier being coupled to the input by capacitor 44. The high input impedance of the amplifier 42 permits the voltages on the signal bus 31 to be monitored with negligible loading of the signal bus. The capacitor 44 neutralizes the parasitic capacity of the signal bus to ground (the parasitic capacity being indicated in dashed outline by the capacitor $C_p$) thereby improving the performance of the synchronously commutated capacitor bank at high frequencies. The output of stage 40 is a discontinuous waveform which results from the sequential connecting of the charged capacitors of stage 30 to the signal bus 31.

The output smoothing circuit 50 includes one or more filter sections which apply to the output terminals 52, a voltage waveform which is a continuous approximation, as indicated by the oscilloscope tracing of FIG. 1, of the discontinuous waveform output of amplifier 42. The filters may be comprised of resistors R54 and capacitors C56, and if desired, a buffer amplifier 58 may be inserted after each filter section to provide isolation.

The timing circuit 60, as indicated by the dashed lines 62, closes the switches of stage 30 sequentially to connect the capacitors of stage 30 sequentially to the signal bus 31. The timing circuit may be comprised of a ring counter, such as shown in Fig. 11.15 of the Transistor Manual (Copyrighted 1962, by the General Electric Co.), and a suitable clock oscillator of any one of several well known in the art. The timing circuit is provided with trigger input terminals 64 to which is applied a trigger pulse for synchronizing the electrical filter with the voltage waveform.

OPERATION

To further explain the present invention, a brief statement of the operation of such invention as utilized to measure the evoked response of a human brain when exposed to an external stimulus, will be set forth.

It will be assumed, as shown diagrammatically in FIG. 1, that electrodes 72 and 74 have been applied to the scalp of a human subject, and that the subject is exposed to random flashes of light emanating from a light source 74. The light source 74 is randomly flashed by the random trigger generator 76, which generator is also connected to the input terminals 64 of the timing circuit 60.

As stated above, it is known that an electrical signal will be evoked from the brain of the subject in response to each random flash of the light from the source 74, and that each evoked electrical signal will be obscured or masked by the total or overall electrical brain activity or noise. Thus, the composite electrical signals sensed by the electrodes 72 and 74 will be comprised of randomly occurring electrical signals unrelated to the randomly flashed light and indicative of overall brain activity (noise), and the repetitive electrical signals which are evoked in response to, and hence are coherent with or time related to, the randomly flashed light; the noise to evoked signal ration, as stated above, being approximately 100 or 50 to 1. The composite electrical signals are representable by composite waveforms such as the composite waveforms $W_1$, $W_2$ . . . $W_n$ of FIG. 2 which composite waveforms comprise a random waveform indicative of the brain noise, and a repetitious or recurrent waveform indicative of the evoked electrical signals. Thus, it will be understood that the evoked electrical signals can be measured, or extracted from the composite electrical signals, by averaging corresponding ordinate points (indicated by $V_1$, $V_2$, , , , $V_n$, occurring during the time interval $t$ as shown in FIG. 2) of successive, or repetitiously occurring, cycles of the composite electrical signals. The evoked electrical signals, or signals of interest, will consistently contribute substantially identical amounts to the sum whereas the noise will contribute randomly positive and negative amounts which will tend to average to zero, as increasingly larger numbers of composite waveforms are averaged. Thus, the resultant averages of a coordinate point will be $V_R$, and $V_R$ will be the average of $V_1$, $V_2$ . . . $V_n$.

In general the voltage signal to noise ratio of the average waveform signal improves in proportion to the square root of the number of signals averaged. A ten-fold improvement requires that 100 signals be averaged, and a hundred-fold improvement requires that 10,000 be averaged.

In one embodiment of the electrical filter of the present invention, the composite electrical signals or waveforms, were divided into 100 equal time intervals with each time interval being associated with or related to a different coordinate point, such as coordinate point $V_R$. Capacitor C34, C35 . . . C$n$, were provided equal in number to the time intervals, each capacitor being associated with, or related to a different time interval and coordinate point.

Referring again to FIG. 1, and to the statement of operation of the present invention, it will be assumed that the light source 74 has flashed one time in response to a trigger pulse from the random trigger generator 76, and that an electrical signal has been evoked from the brain of the schematically shown subject. The composite electrical signal will be sensed by the electrodes 72 and 74 and will be applied to the input terminals 12. If desired or found to be necessary, the electrodes may be capacitively coupled to the input terminals, and the composite electrical signals may be preamplified, as shown. The buffer amplifier 14 receives and amplifies the composite electrical signal and applies the same to the pre-filter stage 20. The low pass, filter section, comprised of resistor R22 and capacitor C24, rejects those frequencies of the composite signal outside the range of interest. The filtered composite electrical signal is amplified by the buffer amplifier 26 and is applied to the signal bus 31.

The switches S36 through S$n$, under the control of the timing circuit 60, sequentially connect the capacitors C34 through C$n$ to the signal bus at predetermined times and for predetermined intervals. The timing circuit 60 is under the control of the random trigger generator 76, and the same trigger pulse which initially flashed the light source 74 initiates operation of the timing circuit.

As each capacitor is connected to the signal bus 31, a charge is stored in the capacitor which is a function of the composite electrical signal during the interval the capacitor's associated switch is closed. Thus, after one cycle of the composite electrical signal has been applied to the electrical filter, a charge will be stored on each capacitor and such charges will be proportional to the amplitudes of the composite electrical signal during the interval each switch was closed.

Subsequent cycles of the composite voltage are again applied to the input terminals 12 and, in the manner set forth above, the composite signals will be again applied to the signal bus 31 by the input resistor R32. As subsequent cycles of the composite voltage are sampled by the sequential action of the switches S36 through Sn, in the manner set forth above, the charges on each individual capacitor will change as a function of their initial charge at the beginning of each subsequent cycle and the composite voltage applied to resistor R2 during each subsequent cycle. In this manner, the charges on each individual capacitor are related to the average of the composite electrical signal over a predetermined interval determined by the timing circuit and over a number of previous occurrences in response to the stimulus.

Amplifier 42 continuously reads out the voltage on the signal 31 and applies such voltage to the output terminals 52 by means of the output smoothing circuit 50.

The value of the resistor R32, and the value of the capacitors of the capacitor bank 30, provide a significant contribution to the operation of the electrical filter. The time constant formed by resistor R32 and each capacitor when sequentially connected to the bus 31, provides a time constant which determines the number of occurrences over which the electrical filter will perform a point-by-point average of the voltages applied to the input terminals. In general such time constant should be of greater duration than the period of time each switch is closed so as to accomplish significant averaging of the input waveform. Should this criterion not be met, then the voltage across each capacitor will actually assume the voltage of the composite input voltage during each cycle of operation. For significant signal averaging, the voltage across each capacitor must be related to the average over a number of previous occurrences. The number of previous occurrences averaged is given approximately by the time constant provided by resistor R32 and any individual capacitor, divided by the interval during which the capacitor's associated switch is closed. For example, in one embodiment of the present invention, resistor R32 had a value of 200,000 ohms, and each capacitor had a value of 5 microfarads, which RC combination provides a time constant of one second. Each switch was closed for a period or interval of 10 milliseconds, i.e., the entire sweep of 100 such operations lasts for one second. In this embodiment of the present invention, the electrical filter averaged over approximately 100 occurrences of any input voltage applied to the input terminals, that is, the ratio of the one second RC time constant to the 10 millisecond closure of each switch.

A valuable and significant feature of such a scheme of signal averaging, is that different characteristic time constants can be readily obtainable by merely changing, or varying, the single input resistor R32. In general, it is desirable to use as short a time constant as possible such that long periods are not required to allow the output wave form to build up to its final value. However, the amount of noise present in the composite voltage signal may make it necessary to use longer time constants in order to achieve the desired signal-to-noise ratio improvement, consequently, one must wait longer for the greater number of input wave form occurrences to be averaged.

It will be understood by those skilled in the art, that while the electrical filter of the present invention has been described in the context of an electrical filter for measuring and extracting evoked electrical signals from electrical signals indicative of overall brain activity, that the present invention is in no manner limited to such operation and may be utilized in any situation where it is desired to extract or measure a significant signal which is embedded in, or obscured by, noise or interference. It will be further understood by those skilled in the art, that many modifications and adaptations may be made in the present invention without departing from the spirit and scope of the invention.

What I claimed is:

1. Electrical filter apparatus for extracting a signal of interest from a composite waveform comprising:

input means for receiving repetitiously occurring composite electrical signals, each composite electrical signal comprising a repetitiously occurring significant electrical signal of interest and a randomly occurring electrical signal;

a plurality of analog storage means for storing voltages which are representative of time related voltage amplitudes of said composite electrical signals at various time intervals;

a plurality of switch means electrically interposed between said input means and respective ones of said plurality of analog storage means, said plurality of switch means acting to sequentially connect each of said plurality of analog storage means to said input means during predetermined time intervals so that a voltage is stored in each of said plurality of analog storage means during the predetermined time intervals assigned thereto;

means for timing the sequential operation of said plurality of switch means so that the connection sequence of said respective ones of said plurality of storage means to said input means is initiated at a corresponding point for each recurrence of said repetitiously occurring composite electrical signal;

analog computation means for successively comparing voltages stored in said analog storage means with the time related voltage amplitudes of subsequently occurring composite electrical signals and for proportionally changing said stored voltages in accordance with said comparison; and output circuit means for converting the resultant stored voltages into an electrical signal which is a function of time and the resultant stored voltages.

2. The electrical filter apparatus according to claim 1 wherein said timing means includes means for synchronizing the sequential activation of said plurality of switch means with said significant electrical signal of interest.

3. The electrical filter apparatus according to claim 2 wherein said timing means includes means responsive to the initiation of the production of said signal of interest to initiate the sequential operation of said plurality of switch means.

4. The electrical filter apparatus according to claim 3 wherein said analog computation means includes variable resistor means serially connected therein, each of said plurality of analog storage means, when connected to said input means through an associated one of said plurality of switch means, forming a circuit with said variable resistor means whose time constant is selectively variable.

5. The electrical filter apparatus according to claim 4 additionally comprising pre-filter circuit means for attenuating frequency components of said composite waveform which are outside of the useful bandwidth of said analog storage means, said pre-filter circuit means being interposed in said input circuit means prior to said variable resistor means.

6. The electrical filter apparatus according to claim 5 wherein said output circuit means includes at least one smoothing circuit stage whose time constant may be selectively varied.

(References on following page)

References Cited

UNITED STATES PATENTS

| | | | |
|---|---|---|---|
| 3,087,487 | 4/1963 | Clynes | 328—165 X |
| 3,154,747 | 10/1964 | Kendall | 328—165 |
| 3,229,212 | 1/1966 | Rogers | 328—151 X |
| 3,234,472 | 2/1966 | Ebeling et al. | 328—151 X |
| 3,344,262 | 9/1967 | Pryor | 328—151 X |
| 3,390,377 | 6/1968 | Elliott et al. | 328—151 X |
| 3,412,338 | 11/1968 | Bernstein et al. | 328—151 X |
| 3,445,685 | 5/1969 | Roth | 328—167 |

DONALD D. FORRER, Primary Examiner

J. D. FREW, Assistant Examiner

U.S. Cl. X.R.

328—37, 151, 167